(12) United States Patent
Korman (10) Patent No.: US 7,720,319 B2
(45) Date of Patent: May 18, 2010

(54) REGRESSION AND EROSION MEASUREMENT SYSTEM AND METHOD

(76) Inventor: Valentin Korman, 118 Darlington, Huntsville, AL (US) 35801

( * ) Notice: Subject to any disclaimer, the term of this patent is extended or adjusted under 35 U.S.C. 154(b) by 340 days.

(21) Appl. No.: 11/855,825

(22) Filed: Sep. 14, 2007

(65) Prior Publication Data

US 2009/0252450 A1    Oct. 8, 2009

Related U.S. Application Data

(60) Provisional application No. 60/844,528, filed on Sep. 14, 2006.

(51) Int. Cl.
*G02F 1/01* (2006.01)

(52) U.S. Cl. ............... 385/1; 385/4; 385/8; 385/9; 385/134; 385/140

(58) Field of Classification Search ............... 385/1, 385/4, 8, 9, 134, 140
See application file for complete search history.

(56) References Cited

U.S. PATENT DOCUMENTS

| | | | |
|---|---|---|---|
| 4,587,805 A | 5/1986 | Winch et al. | |
| 4,630,437 A | 12/1986 | Winch et al. | |
| 5,107,129 A | 4/1992 | Lombrozo | |
| 5,387,791 A | 2/1995 | Weiss | |
| 5,446,278 A | 8/1995 | Weiss | |
| 6,734,411 B1 * | 5/2004 | Imbsei et al. | 250/205 |
| 6,778,269 B2 | 8/2004 | Fink | |
| 6,950,193 B1 | 9/2005 | Discenzo | |
| 7,430,445 B2 * | 9/2008 | Esenaliev et al. | 600/344 |
| 7,506,941 B2 | 3/2009 | Miller | |

* cited by examiner

Primary Examiner—Jennifer Doan (57) ABSTRACT

A method and system for determining the length of collocated waveguides in a high erosion environment, such as a solid rocket motor or a braking system. The system provides for mating optical waveguides having different attenuation coefficients within the combusting, eroding, or otherwise regressing material. Optical energy generated by the environment (e.g., from burning fuel), or which is introduced and scattered into the environment, travels through the waveguides to detector means coupled thereto. The intensities of the arriving optical energy are compared and the length of the collocated waveguides calculated therefrom. By calculating the length of the waveguides over time, a regression rate is determined.

17 Claims, 12 Drawing Sheets

REGRESSION AND EROSION MEASUREMENT SYSTEM AND METHOD

CROSS REFERENCES TO RELATED APPLICATIONS

This original non-provisional application claims priority to U.S. provisional application No. 60/844,528, filed Sep. 14, 2006 and entitled "Regression and Erosion Measurement System," which is incorporated herein by reference.

BACKGROUND OF THE INVENTION

1. Field of the Invention

The present invention is a system and method for measuring regression of a material by determining the length of optical waveguides mated to the material in a high erosion environment. More specifically, the present invention may be used to determine the burn rate, or regression rate, of a solid fuel rocket motor, braking system, or any other regressable material in a volatile environment by dividing the change in length of the waveguides by the change in time.

2. Description of the Related Art

A solid rocket or a solid fuel rocket is a rocket with a motor that uses solid propellants—fuel and oxidizer. Solid rockets are simple, reliable, and well-known in the prior art, but because of the highly volatile and high temperature environment of combusting solid fuel in the rocket motor, precise measurement of the rate of consumption of the fuel, termed "regression" or "regression rate," is difficult. More precise information than is currently available by methods and devices used in the art would be of benefit to the engineers and scientists who design solid fuel rocket motors.

A simple solid rocket motor consists of a casing, nozzle, grain (propellant charge), and igniter. The grain behaves like a solid mass, burning in a predictable fashion and producing exhaust gases, and is usually molded from a thermoset elastomer, fuel, oxidizer and catalyst. For example, hydroxyl-terminated polybutadiene (HTPB) and polybutadience acrylonitrile (PBAN) are typical elastomers that double as fuel. Ammonium perchlorate is the most common oxidizer. The nozzle dimensions are calculated to maintain a designed chamber pressure, while producing thrust from the exhaust gases.

Not surprisingly, rocket engineers have long had difficulty measuring the burn rate, also called the regression rate, of the materials due to the volatile nature of a combusting solid rocket motor, which makes measurements of its characteristics during combustion very difficult. Not only must any measuring system be capable of operating in and withstanding the high temperature and violent environment, but such a system must also not affect the operating conditions within the rocket. In other words, such a system must be designed around the inherent dangers of operating in such a combustible environment. For example, electromagnetic interference (EMI), which can cause disruption of electronic components, is generally not desirable within such a sensitive environment.

More precise measurement of the regression rate within the rocket motor would serve at least two useful purposes. First, such a measurement would increase the ability of rocket engineers to design solid rocket motors. A large part of the current design process is trial and error: The engineers will design a solid rocket motor but have no way to accurately test how the fuel grain burns without launching the rocket. Not only is this very expensive, but it is also very time consuming. The present invention, by providing engineers with more accurate measurement of the firing characteristics of the motor, reduces the need for trial and error during the design process, in part by allowing more accurate measurement of burn rate characteristics during test flights.

Second, such precise measurements would provide data to engineers during rocket operation that may indicate a potential problem with a rocket motor, or even worse, a catastrophic event. By using one or more of the measurement systems described herein, burn characteristics can be extrapolated and analyzed to determine whether motor operation is faulty. For example, one such a potentially catastrophic event is termed "asymmetrical burn," wherein the solid rocket motor burns at different and unintended rates throughout, which could cause the rocket, inter alia, to move off course or have other adverse effects.

Accordingly, the present invention provides a system for, inter alia, measuring the regression rate in a solid rocket motor as it combusts, as well as measuring erosion of materials in other volatile environments.

BRIEF SUMMARY OF THE INVENTION

The present invention, comprising a regression measurement system and method, is capable of determining the length of collocated fiber optic cables in a high temperature and high erosion environment. By determining the length of collocated fibers within the eroding material (e.g., the grain of a rocket motor) at given instanta, the burn (or erosion) rate, or rate of fuel consumption, can be determined by dividing the change in length by the elapsed time.

According to one feature of the present invention, at least two optical waveguides having different attenuation coefficients are matable to a regressable material. Detector means convert a received optical electromagnetic signal from each of the waveguides to an electrical signal representative of the intensity of the electromagnetic signals. Thereafter, circuitry means electrically connected to the detector means converts the two representative electrical signals into at least one electrical signal representative of the length of the collocated optical waveguides.

BRIEF DESCRIPTION OF THE DRAWINGS

The present invention, as well as further objects and features thereof, are more clearly and fully set forth in the following description of the preferred and alternative embodiments, which should be read with reference to the accompanying drawings, wherein.

DETAILED DESCRIPTION OF THE INVENTION

The present invention, comprising a regression measurement system and method, is capable of determining the length of collocated optical waveguides in a high temperature and high erosion environment. "Collocated" means having approximately the same length with the mated ends of the waveguides being positioned adjacent each other so that light from a common source will enter each of the waveguides with approximately equal intensity. By determining the length of collocated waveguides within the regressing material (e.g., the fuel grain of a rocket motor) at given instants, the burn (or erosion or regression) rate, or rate of fuel consumption, can be determined by dividing the change in length by the elapsed time. "Regression," as used herein, refers to the reduction of a material at a point, and may alternatively be referred to as erosion, ablation, wear, etc., depending on usage in the trade. For purposes of this disclosure, these terms should be used interchangeably.

More specifically, the present invention comprises optical waveguides mated to a cross-section (or other desired locale, such as side, top or bottom surfaces) of a regressable material, such as a solid fuel grain or friction material of a braking system. As the material regresses (i.e., the fuel burns, the friction material wears, etc.), the optical waveguides regress as well. As the optical waveguides erode, they couple optical energy from the burning layer of fuel. The resulting optical transmission obeys the equations described below. Therefore, a measure of waveguide length can be coupled to fuel length and analyzed over a sampling window to yield regression or burn rate.

As contemplated by the present invention, the optical waveguides have different attenuation coefficients. In other words, one waveguide has, by its physical state or material properties, either a higher or lower loss per unit length than the other waveguide. The optical waveguides are then connectorized and mated to a bulkhead or fed through into the combustion chamber wall of the rocket, or through the friction material of a brake shoe.

The other ends of the optical waveguides are connected to the detector means that includes some light detection components, such as photodiodes. The detector means samples the energy from the burning layer, and therefore any photodiode may be used that can sufficiently detect optical energy in the visible and/or the infrared part of the optical spectrum (e.g., silicon, germanium, indium gallium arsenide, etc.). Alternative, any light detection means may be used, such as photoresisters. The response of the detector means is sampled by suitable circuitry means, and the resulting data processed and conditioned via an algorithm.

Given two optical waveguides—$W_1$ and $W_2$—with differing attenuation coefficients—$\alpha_1$ and $\alpha_2$, respectively—the two waveguides with a small cross-section that are collocated (i.e., the lengths L are the same) see the same optical emission ($I_0$) from the burning or thermal erosion of the fuel grain. The losses due to scattering within the optical waveguide $W_1$ and optical waveguide $W_2$ are governed by basic physics optics theory, where $$I_1 = I_0 e^{-\alpha_1 L} \tag{1}$$

and $$I_2 = I_0 e^{-\alpha_2 L}, \tag{2}$$

where $I_1$ and $I_2$ are the optical emissions from $W_1$ and $W_2$, respectively. The ratio of $I_2$ to $I_1$ will eliminate the initial optical flux. The natural log can be taken and algebra applied to yield an expression for length:

$$L = \frac{\ln\left[\frac{I_2}{I_1}\right]}{\alpha_1 - \alpha_2} \tag{3}$$

So long as the attenuation coefficients differ, equation (3) will provide the length L of the optical waveguides within the combusting solid fuel or other eroding material. The coefficients of attenuation may be determined via in situ calibration, laboratory measure, or manufacturer specification.

Because this method and system do not employ any mode of phase modulation techniques, no conditions are placed on the type of optical waveguide. The type of waveguide, however, should be chosen to maximize the transmission of the optical energy or flux (e.g., graded index multimode cable). Moreover, by tapping a non-distorted fiber that redirects a known amount of the optical energy into the fiber with a fiber optic splitter, a spectrometer can split the optical signal and determine the chemical signature (i.e., spectral emission and absorption lengths) and blackbody temperature of the burning layer. In addition, an advantage of the present invention is the absence of electromagnetic interference (EMI) that may be caused by other methods.

The present invention can also be utilized to measure erosion rates in braking and similar systems by mating the waveguides to—for example, by embedding the fibers—the substance to be measured. By appropriately positioning the waveguides within the eroding material (e.g., the braking system of a commercial truck), as the braking material erodes by friction over time, the length of the fibers will erode as well. By actively generating an external light source and directing the light into the fibers, the same principles described herein will yield the erosion rate of the material. Accordingly, the present invention may be used, inter alia, in braking systems in commercial airlines, commercial trucking and other automotive applications, turbine and brush erosion, and military vehicles.

The present invention further contemplates a third eroding waveguide into which light is introduced via a fiber-coupled laser, LED, or similar means. The introduced light is directed by the third fiber and projected onto a convenient surface (e.g., a brake rotor or brake disc) to provide the scattered light necessary for the normal functioning of the system. In other words, the scattered light becomes the light source for emission $I_0$ in the equations described herein.

This approach is practical when an existing external source of light, such as thermal or ambient light, is not available. The addition of the third fiber does not preclude, however, the use of the existing light as a source because the incident intensity is not a factor in the workings of the equations that describe the sensor operation. Moreover, a light source may be chosen for the third fiber that only passes a part of the spectrum that would also allow for a complimentary temperature measurement as previously described.

Figure 1:
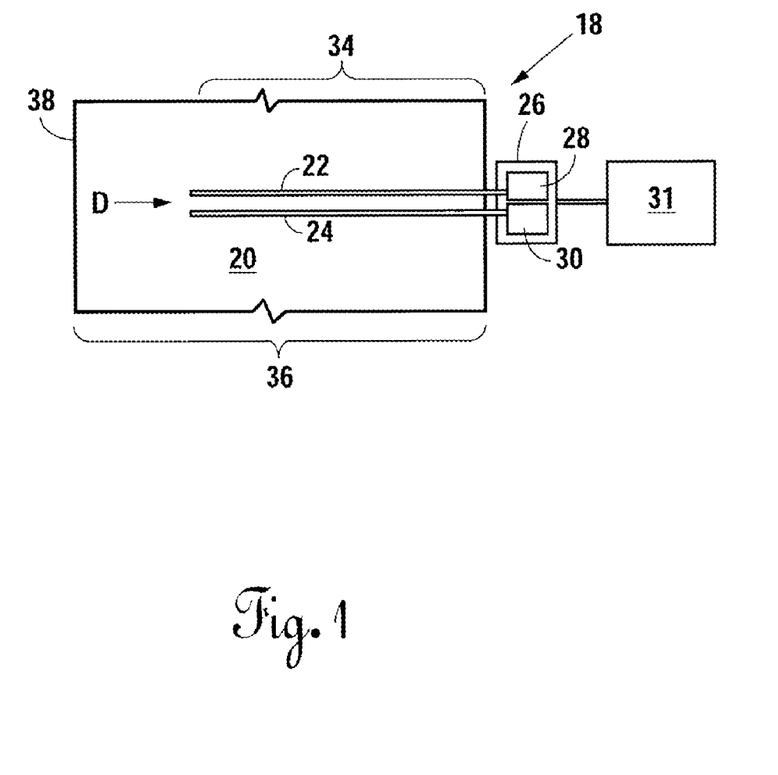
FIG. 1 shows the functional relationship between the components of the present invention.

FIG. 1 shows the preferred embodiment of the system 18 of the present invention as made and used in conjunction with a regressable material 20, which may be solid rocket fuel grain or any other material that regresses, erodes or ablates with time and/or use. Two optical waveguides 22, 24 having equal length and being collocated are mated to the regressable material 20 by embedding the waveguides 22, 24 therein. Alternatively, the waveguides 22, 24 may be mated adjacent to the regressable material 20 at a side thereof, so long as the waveguides 22, 24 will regress with the regression of the material 20. Although any form of optical waveguide will suffice for purposes of the present invention so long as the chosen optical waveguide is regressable with the material, fiber optic cables are preferred because of cost considerations, availability, and ease of use. The waveguides 22,24 have different attenuation coefficients, $\alpha_1$ and $\alpha_2$ respectively, and protrude from within the regressable material 20 into, and are coupled with, detector means 26 for converting optical electromagnetic signals from each of the two optical waveguides 22, 24 to an electrical current representative of the intensity of those optical electromagnetic signals, as will be described hereinafter in greater detail. Detector means in the preferred embodiment comprise two photodiodes 28, 30: one photodiode 28 is coupled to the first optical waveguide 22, while the other photodiode 30 is coupled to the second optical waveguide 24. In alternative embodiments, photoresisters may also be used, and, more generally, any component capable of detecting optical radiation and transforming such radiation into electrical current, voltage, or other signal is appropriate for use in the present invention.

Still referring to FIG. 1, the detector means 26 provides electrical currents representative of the intensity of the electromagnetic signals to electrically connected circuitry means 31 for converting the representative electrical currents into an electrical signal representative of the length of the two optical waveguides 22, 24 according to the equations described hereinabove.

Although in FIG. 1 the optical waveguides 22, 24 are mated with only a portion 34 of the regressable material 20, the waveguides 22, 24 could be mated with the material 20 to any extent desired. For example, if the regression rate throughout the entire thickness (or length) 36 of the material 20 is desired, the waveguides 22, 24 can be mated throughout the material 20 to the distal end 38 thereof. If the regression rate is of interest only within a limited area, then the waveguides 22, 24 can be disposed only therein. Although not required, it is preferred that the optical waveguides 22, 24 are oriented parallel to the direction D of anticipated regression.

Figure 2A:
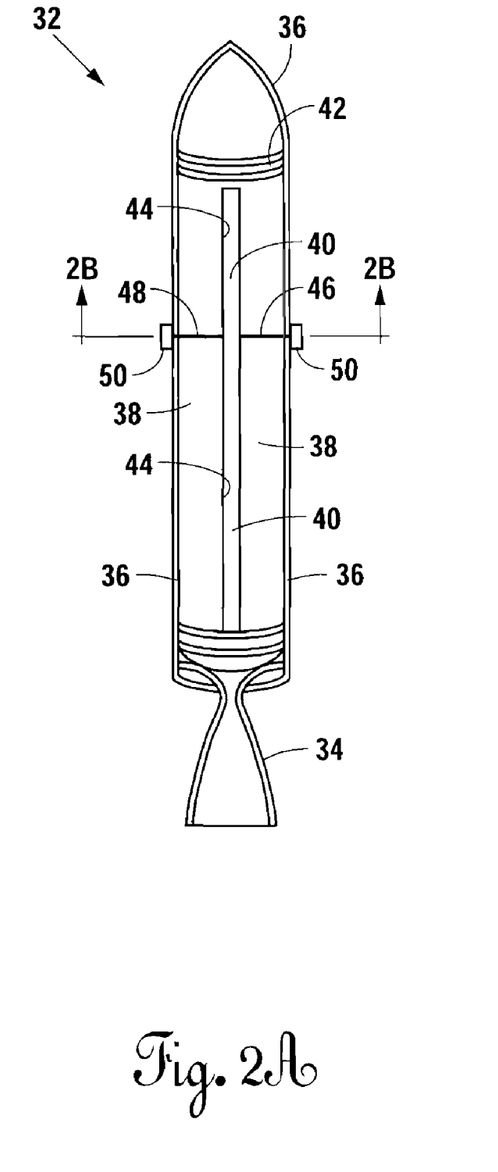
FIGS. 2A and 2B illustrate the present invention as provided for use with a conventional solid rocket motor.
Figure 2B:
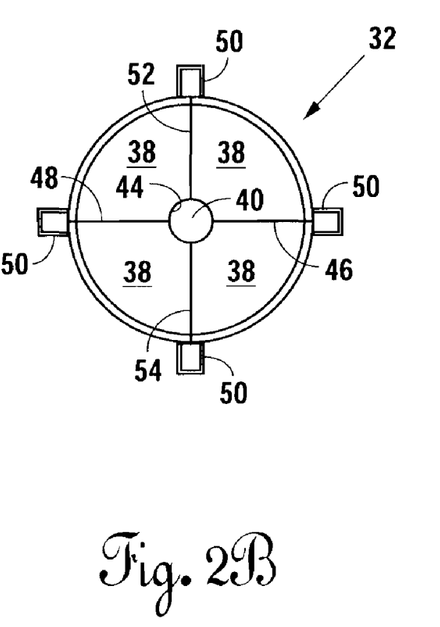

As shown in FIGS. 2A and 2B, according to one embodiment of the present invention, the system and method of the present invention may be used to calculate the regression rate of fuel grain 38 in a solid rocket 32. The fuel grain 38 is contained within a casing 36 and is formed to define an oxygen region 40 that facilitates burning of the fuel grain 38. When ignited using an initial charge 42, the fuel grain 38 burns outwardly from the interior surface 44 thereof that defines the oxygen region 40, and exhaust exits the oxygen region 40 into, and through, a nozzle 34 to provide thrust.

Optical waveguide pairs 46, 48 are mated with the fuel grain 38 by embedding the waveguide pairs 46, 48 therein until the collocated ends thereof intersect with the interior surface 44 of the fuel grain 38. Though not shown in this figure for the sake of simplicity, each waveguide pair 46, 48 is composed of two waveguides having different attenuation coefficients, as described with reference to FIG. 1. The optical waveguide pairs 46, 48 protrude through the casing 36 and are coupled with (i.e., connectorized to) the detector means (as described with reference to FIG. 1) and circuitry means (as described with reference to FIG. 1) contained within instrumentation housings 50. The instrumentation housings 50 may be fixed to the casing 36 using standard fastening techniques known in the art, such as rivets or screws. Because the fuel grain 38 burns radially outwardly from the oxygen region 40, each waveguide pair 46, 48 is preferably oriented parallel to this radially outward direction.

FIG. 2B depicts a sectional view of the rocket 32 and regression measurement system through section line 2B-2B of FIG. 2A. While the oxygen region 40 is cylindrical in shape, those skilled in the art are adept at configuring the shape of the fuel grain 38 and oxygen region 40 to achieve desired burn characteristics. Accordingly, it may be desirably to mate additional fiber optic pairs 52, 54 to the fuel grain 38 to achieve measurements at different locations thereof. In practice, any number of optical waveguide pairs may be mated to the fuel grain 38 by embedding or otherwise mating such pairs therein and extruding them through the casing 36 at various positions both vertically and around the casing 36.

Figure 3:
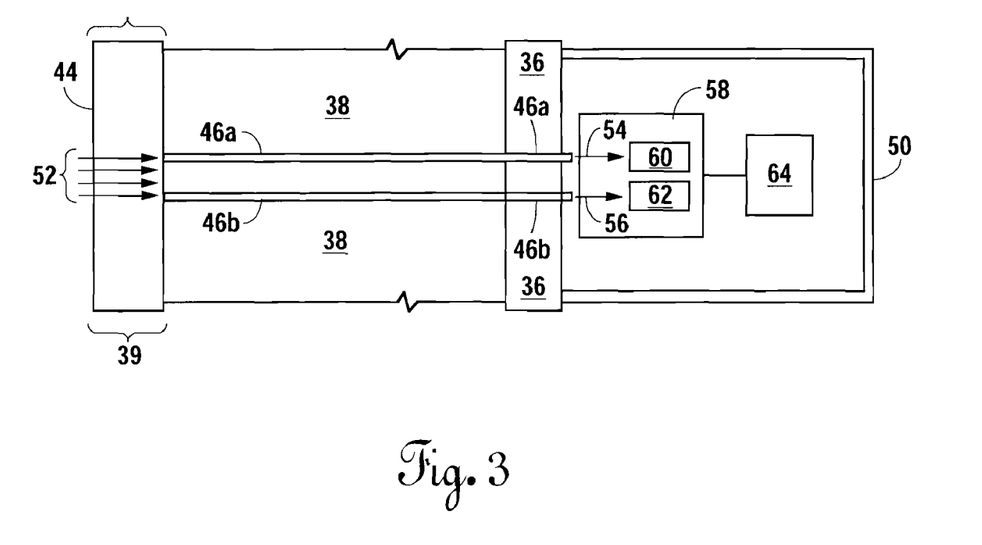
FIG. 3 depicts the system of the present invention in use to determine the regression rate of fuel grain in a solid rocket motor.

FIG. 3 depicts the embodiment of the present invention, as described with reference to FIGS. 2A and 2B, in use. More specifically, FIG. 3 depicts a section 39 of fuel grain 38 during combustion and the simultaneous regression of an optical waveguide pair 46 comprising fiber optic cable 46a having optical coefficient $\alpha_1$, and fiber optic cable 46b having a different optical coefficient $\alpha_2$.

The waveguide pair 46 is initially mated within the fuel grain 38 so that the mated end of the cables 46a, 46b are collocated at the interior surface 44 thereof. As the fuel grain 38 burns over a section 39, fiber optic cables 46a, 46b are burned at the same rate and regress with the burning fuel grain 38. In other words, the lengths of fiber optic cables 46a, 46b decrease at the same rate of burning. In addition, the combustion of the fuel produces optical emission 52 of intensity $I_0$. This emission 52 enters each of the fibers 46a, 46b at generally the same point because of the collocation of their mated ends. In other words, the distance between the mated (i.e., embedded) ends of the fibers 46a, 46b is sufficiently small such that the variation of intensity of emission 52 entering each of the fibers 46a, 46b is negligible.

The optical emission 52 resulting from the combustion is received into the mated ends of each of the fibers 46a, 46b with initial intensity $I_0$. Because of the differing attenuation coefficients of the fibers 46a, 46b, the energy exits the fibers 46a, 46b at the ends proximal to the detector means 58 as first energy 54 with intensity $I_1$ and second energy 56 with intensity $I_2$. $I_1$ and $I_2$ are calculable according to equations (1) and (2) hereinabove, where $I_0$ is the optical energy entering the fiber, $\alpha_x$ is the attenuation coefficient of the fiber, and L is the length of the fiber.

The resulting first energy 54 and second energy 56 are coupled into the detector means 58 comprising a first photodiode 60 and a second photodiode 62. The detector means 58 converts the optical first energy 54 and second energy 56 to an electrical current representative of the intensity of each of the energies 54, 56 and provides the representative currents to circuitry means 64 for converting the two representative electrical currents into an electrical signal representative of the length L of the fiber optic cables 46a, 46b according to equation (3), as described hereinabove. This representative signal may be wirelessly transferred to a remote monitoring station separate from or in conjunction with other rocket telemetry and status data. Instrumentation housing 50 shields the detector electronics 58 and circuitry means 64 from damage during flight and may be secured to the casing 36 using fastening techniques commonly practiced in the art.

Figure 4:
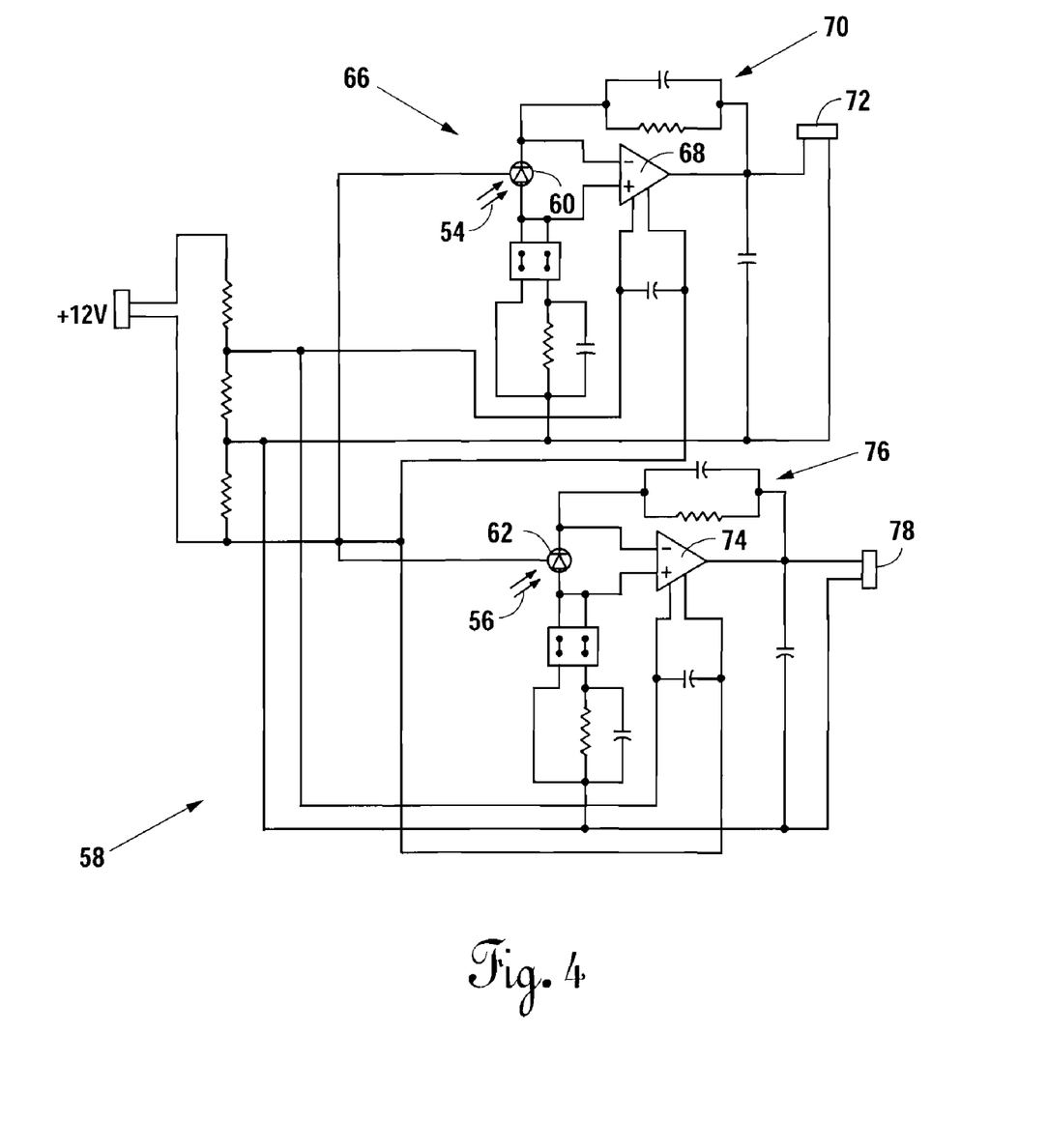
FIG. 4 discloses a pre-amplification circuit of detector means for converting the optical electromagnetic radiation from two waveguides into electronic signals.

FIG. 4 depicts the detector means 58 for converting an optical electromagnetic signal from the two optical waveguides (not shown) to an electrical current representative of the intensity of the electromagnetic signals. The detector means 58 comprises a pre-amp circuit 66 for converting received optical energy into a usable electrical signal. In operation, an optical waveguide (not shown) is coupled to a first photodiode 60, which converts electrical energy into a current. This current is then amplified with disclosed preamp circuit 66, which is a common circuit known to those in the electronic arts and comprises an op amp 68 and RC filter 70, and the signal is then produced at a first output 72. Another optical waveguide (not shown) is coupled to a second photodiode 62 in the same manner, and an op amp 74 in combination with an RC filter 76 provides the resulting current signal to second output 78. The resulting currents at first output 72 and second output 78 are representative of the intensities of the optical electromagnetic energies 54, 56 received at the photodiodes 60, 62. Such circuits and their equivalents are well-known in the electronic arts. The circuit 66 depicted in FIG. 4 may be known as a trans-impedance amplifier in the electronic arts and is frequently used to provide large amounts of gain while minimizing associated noise. It should be noted that the pre-amp circuit 66 disclosed in FIG. 4 is particularly appropriate when the intensities (and therefore the resulting representative currents) of the received electromagnetic energies 54, 56 are weak, but may not be required in all applications.

Figure 5:
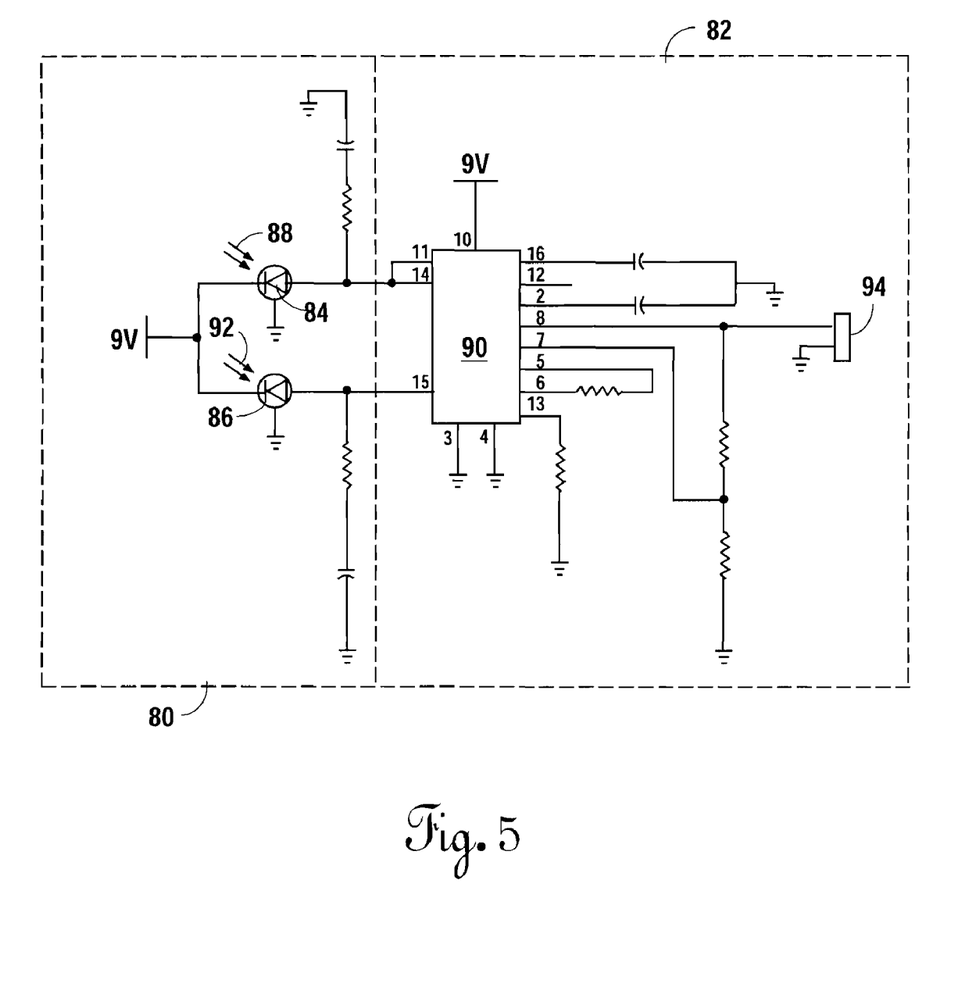
FIG. 5 is an electrical schematic of the circuitry means of the present invention for converting at least two electrical currents into at least one electrical signal representative of the length of the two optical waveguides.

FIG. 5 depicts an alternative embodiment of detector means 80 which is electrically coupled to circuitry means 82 for providing a signal representative of the length of collocated optical waveguides (not shown). As described with reference to FIG. 4, the optical waveguides (not shown) are coupled to first and second photodiodes 84, 86 respectively. Optical energy 88 is received by first photodiode 84 and converted to a current, which is received by natural log amplifier 90. Similarly, the second optical energy 92 is received by second photodiode 86 and converted to a current, which is also received by the natural log amplifier 90. The disclosed circuitry means 82 provide for generating a signal representative of the length L of the collocated optical waveguides (not shown) according to the equations described herein at the output 94. Such means and their equivalents are known to those in the art.

Figure 6:
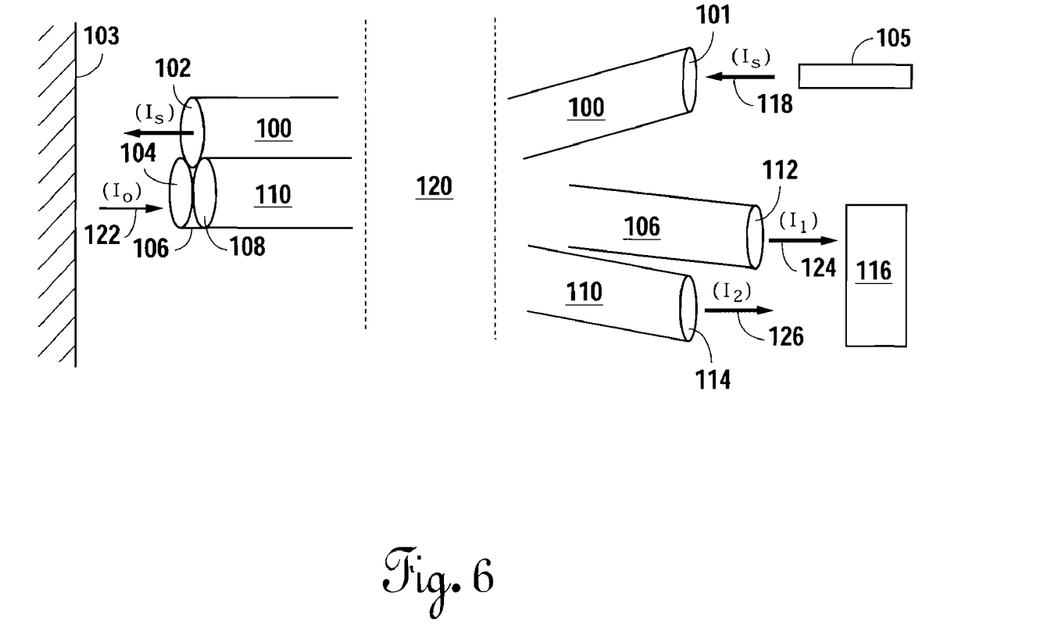
FIG. 6 illustrates the use of a third optical waveguide to provide a light source to the regressing material.

In some environments, regression of a material will not contemporaneously result in production of optical electromagnetic energy. Accordingly, an alternative embodiment of the present invention provides for the use of a third optical waveguide to transmit optical energy from an optical electromagnetic source. As shown in FIG. 6, a third optical waveguide 100 has a distal end 102 collocated with a distal end 104 of a first optical waveguide 106 and a distal end 108 of a second optical waveguide 110. As described hereinabove, proximal ends 112, 114 of the first and second optical waveguides 106, 110 respectively, are coupled to detector means 116 to receive optical electromagnetic energy emanating therefrom. Each of the first, second and third optical waveguides 106, 110, 100 extend through a non-eroding transmission zone 120.

Optical energy 118 having intensity $I_S$ is transmitted into the proximal end 101 of the third optical waveguide 100 by an optical electromagnetic radiation source 105, such as an LED, laser, or other radiation generating means. Optical energy 118 propagates through the optical waveguide 100, emerging from the distal end 102 that is mated to the regressable material (not shown) and scatters radiation against a surrounding surface 103. Due to this scattering effect, scattered energy 122 having intensity $I_0$ enters the distal ends 104, 106 of the first waveguide 106 and second waveguide 110. This scattered energy 122 then propagates through the first and second waveguides 106, 110 as previously described. Because it is also collocated, the third waveguide 100 erodes with the first waveguide 106 and second waveguide 110, thereby ensuring the distal end 102 of the third waveguide 100 is collocated with the distal ends of the first and second waveguides 106, 110 to scatter optical energy 122 thereinto. The non-eroding transmission zone shown in FIG. 6 is that portion of the fibers not mated to (e.g., embedded within) the regressable material.

Still referring to FIG. 6, the differing attenuation coefficients result in the emergence of first electromagnetic energy 124 having intensity $I_1$ and second electromagnetic energy 126 having intensity $I_2$ from the proximal ends 112, 114 of the first and second waveguides 106, 110 respectively. The detector means 116 and electrically connected circuitry means (not shown) thereafter may be used as described above to calculate the length of the collocated waveguides 106, 110.

Figure 7A:
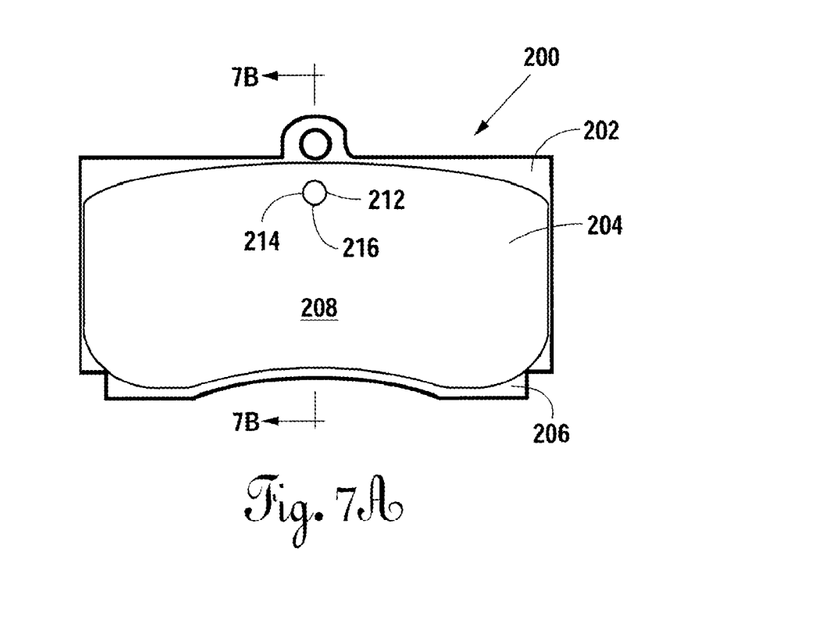
FIGS. 7A through 7C disclose the present invention in use with a conventional braking system.
Figure 7B:
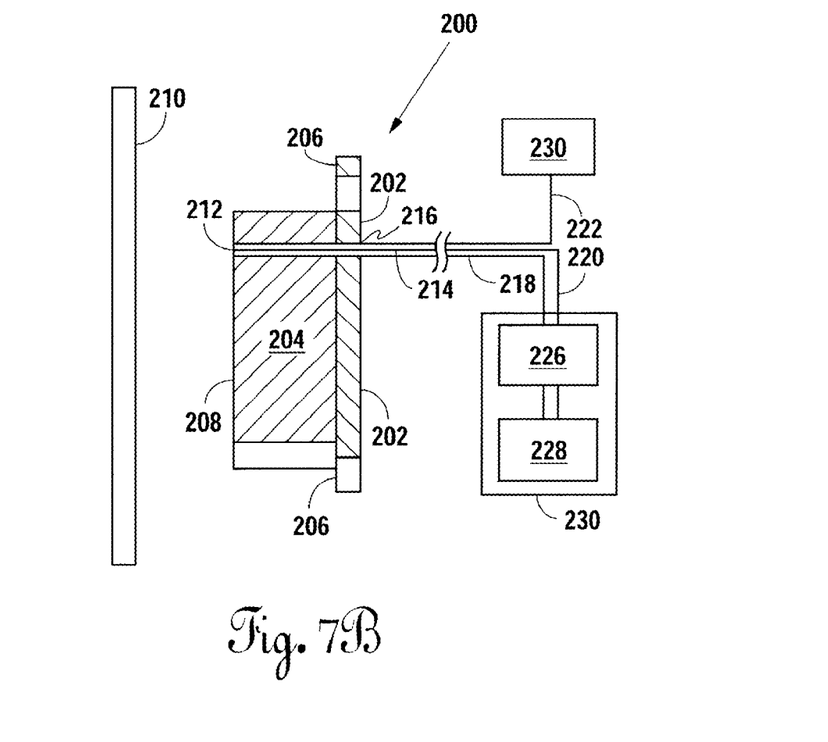

As noted, the present invention is useful with respect to measurement of a regression rate vis-à-vis any regressable material. FIGS. 7A and 7B illustrate an alternative embodiment of the invention in use with respect to a conventional braking system. FIG. 7A is a front elevation view of a conventional brake pad 200 comprising a steel plate 202 with a friction material 204 bound to a front side 206 thereof. FIG. 7B is a sectional side elevation of the conventional brake pad through section line 7B-7B of FIG. 7A. When braking action is caused by a vehicle operator, the front surface 208 of the friction material 204 is caused to contact a rotor 210, which in turn provides the stopping power for the vehicle. Typical materials used for the friction material 204 include asbestos and aramid fibres. Over time, brake pads wear, and usually must be replaced regularly. By implementation of the present invention in combination with a braking system, the regression rate of the friction material 204 may be measured.

As further shown in FIGS. 7A and 7B, a distal end 212 of a triad 214 of optical waveguides are positioned at the front surface 208 of the friction material 204 of the brake pad 200. The triad 214 includes a first optical waveguide 218 having an attenuation coefficient $\alpha_1$, a second optical waveguide 220 having an attenuation coefficient $\alpha_2$, and a third optical waveguide 222. Preferably the optical waveguides 218, 220, 222 are fiber optic cables because of cost considerations and ease of use. The triad 214 may be secured using epoxy or similar bonding agent into a hole 216 drilled through the friction material 204 and steel plate 202. The hole 216 is preferably sized such that the collocated triad 214 of waveguides snugly fits therewithin.

Figure 7C:
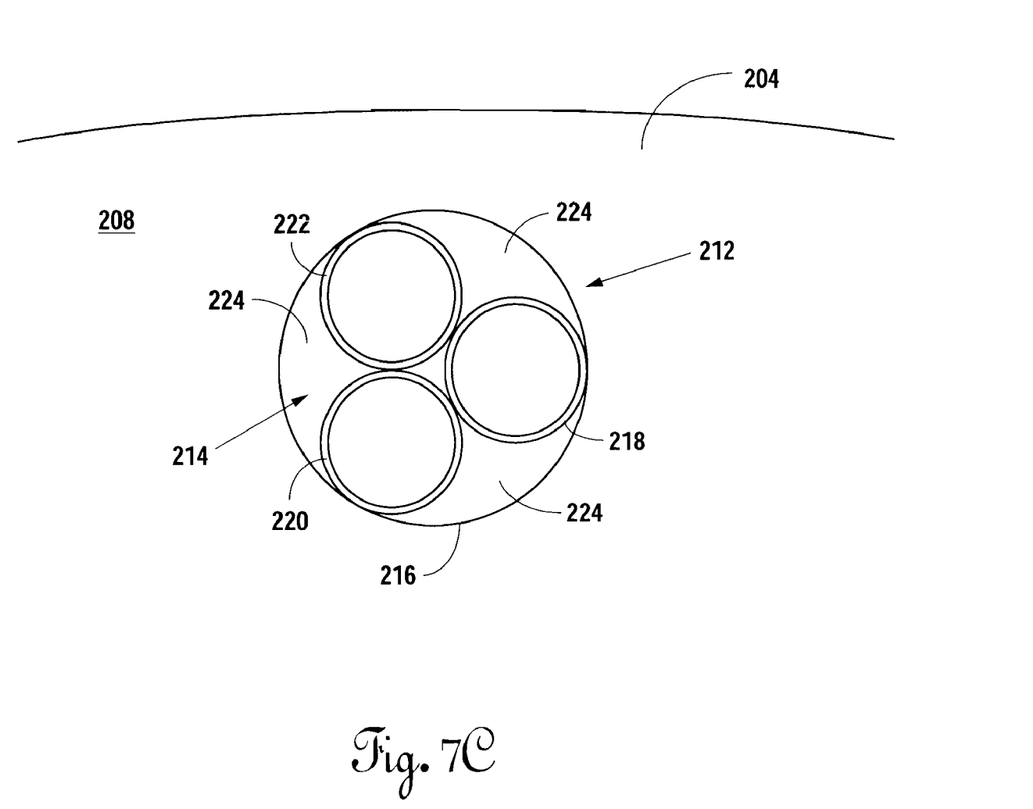

FIG. 7C shows an enlarged view of the triad 214 of collocated waveguides 218, 220, 222 as disposed in the hole 216 and secured with epoxy 224. While the triad 214 of waveguides is disclosed in a preferred triangular configuration, a linear or other configuration may be used so long as the ends of the waveguides 218, 220, 222 are collocated.

Referring again to FIG. 7B, the ends of first optical waveguide 218 and second optical waveguide 220 proximal to the detector means 226 and coupled thereto as described with reference to the other embodiments disclosed herein, which detector means 226 are, in turn, electrically connected to circuitry means 228. In this alternative embodiment, the detector means 226 and circuitry means 228 are contained with a housing 230, which may be affixed to the wheel well of the vehicle or otherwise appropriately positioned. The third optical waveguide 222 is coupled to a radiation source 230, which source may also, but is not required to, be contained within the housing 230. While the attenuation coefficient of the third optical waveguide 222 is not relevant to the calculation of the length of the first and second waveguides 218, 220, it is desired that such coefficient is not so great so as to attenuate the transmission of optical energy such that adequate scattering cannot occur.

During use, as the braking system is actuated by the vehicle operator, the front surface 208 of the friction material 204 will contact the rotor 210 while it is rotating, causing the front surface 208 to wear and, over time, regress in thickness. Contact with the rotor 210 causes wear at the mated ends of the first waveguide 218, second waveguide 220, and third waveguide 222 respectively, which thus regress as the same rate at the friction material 204. Contact with the rotor 210 also causes optical radiation from the third optical waveguide 222 to be scattered off the rotor 210 and collected by the first and second optical waveguides 218,220, as described with reference to FIG. 6. The length of the collocated fibers may then be calculated as previously described.

Still referring to FIGS. 7A and 7B, it should be noted that, while application of the present invention to a braking system as described uses an active light source, detector means relying on other technologies (e.g., Ge or InGaAs photodiodes) operate in the infrared spectrum, and thus obviate the need for an independent light source as described with reference hereto. In other words, the measured intensity can be of infrared (or other non-visible) energy, rather than visible light, generated from the friction of the friction material 204 against the rotor 210.

It should further be noted that in this alternative embodiment, because the length of the collocated waveguides is greater than the thickness of the friction material, additional calibration may be used to derive the thickness T from the length L due to the physical constraint that the waveguides must be remotely positioned from the brake pad during operation (i.e., a wheel well). An alternative embodiment contemplates affixing the detector means to the steel plate 202 and remotely positioning the circuitry means. Yet another alternative embodiment provides that only the portions of the waveguides mated with the regressable material need have different attenuation coefficients, as the equations discuss above allow those portions of the first and second waveguides having the same attenuation coefficient to cancel, yielding only the collocated length of waveguide for which such attenuation coefficients are different.

Figure 8:
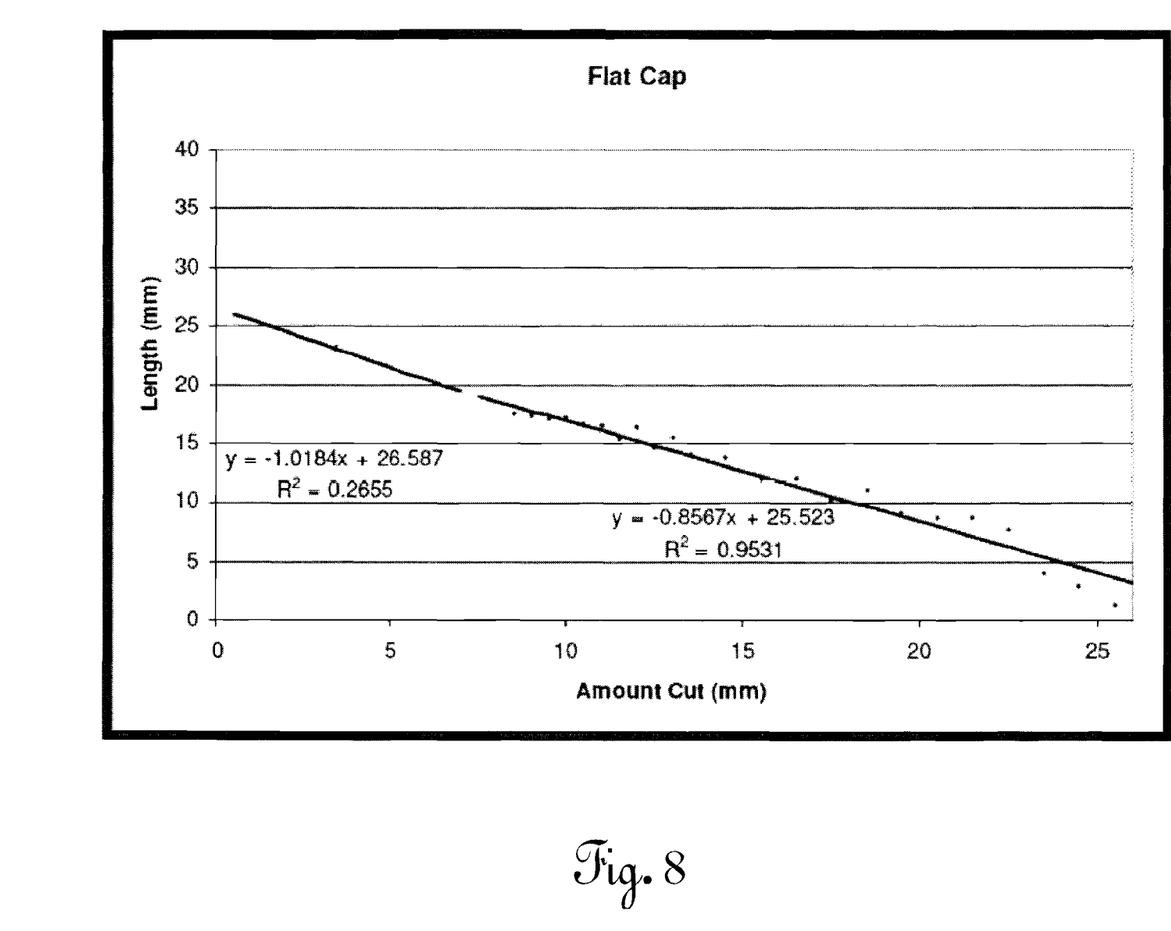
FIG. 8 and FIG. 9 show experimental results from mechanical machining simulating braking using the measurement system of the present invention.
Figure 9:
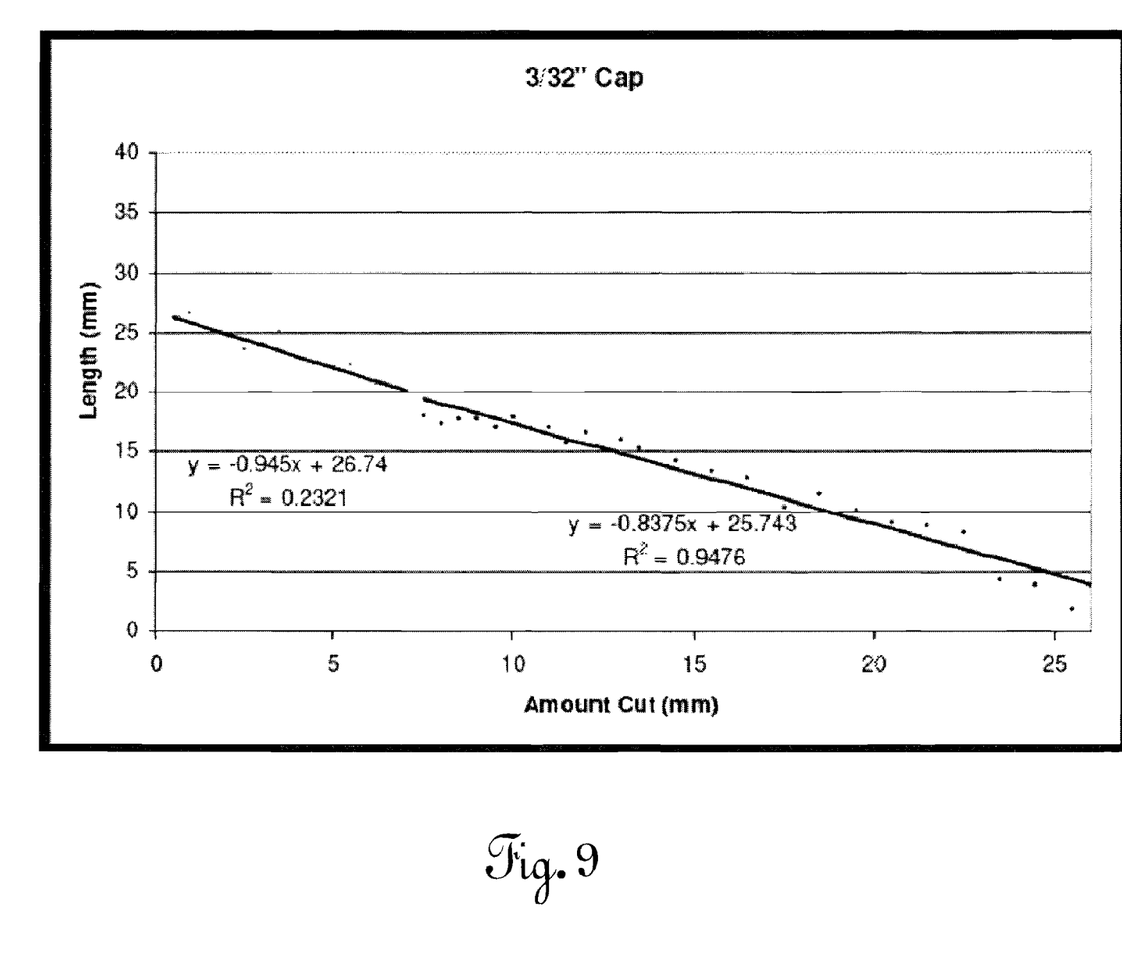

FIG. 8 and FIG. 9 show graphs of test results using the present invention. In both tests, waveguides of the present invention were mounted within an aluminum fixture using a milling machine. Data was taken under conditions simulating braking using three waveguides as discussed with reference to FIGS. 7A through 7C, and, in each case, the data discloses a linear relationship between the length of the amount of the fixture cut (x axis) and the length of the waveguides (y axis).

Figure 10:
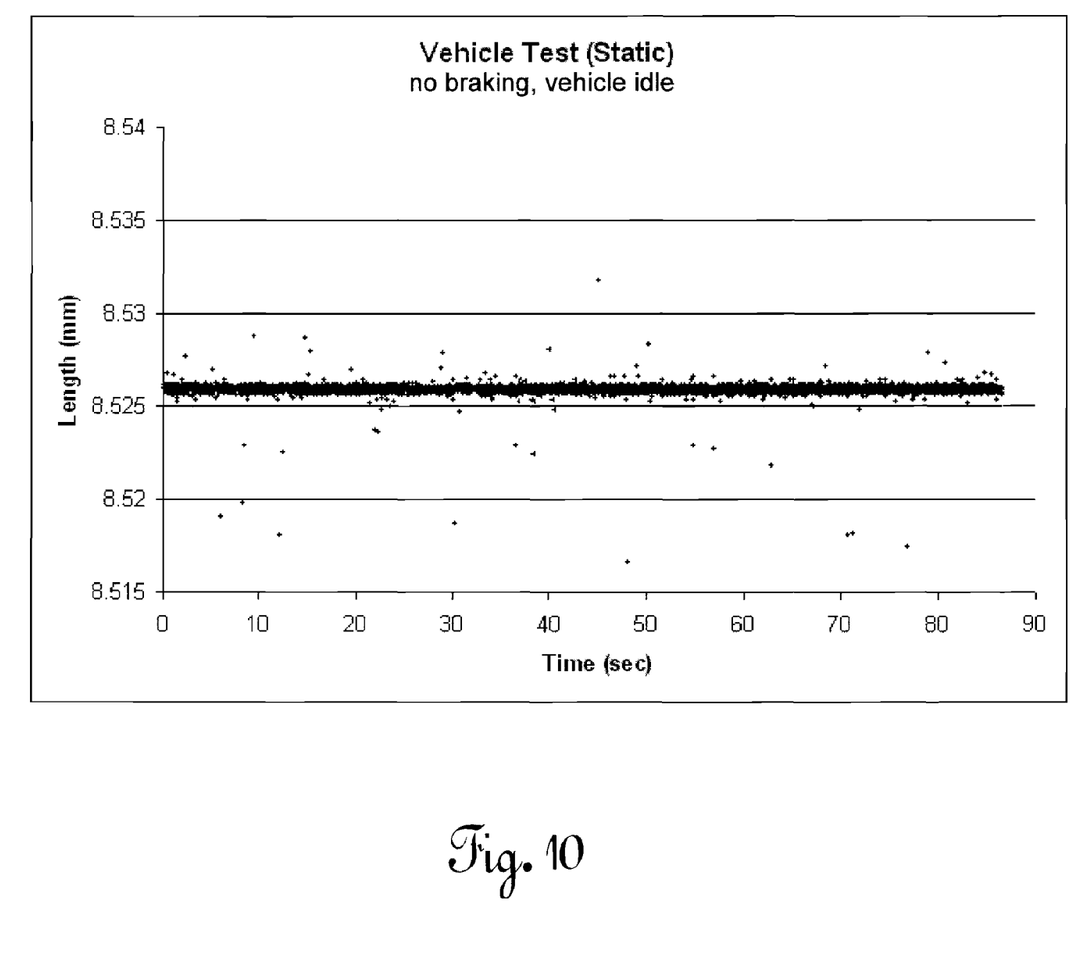
FIG. 10 and FIG. 11 disclose actual road tested vehicle breaking data.
Figure 11:
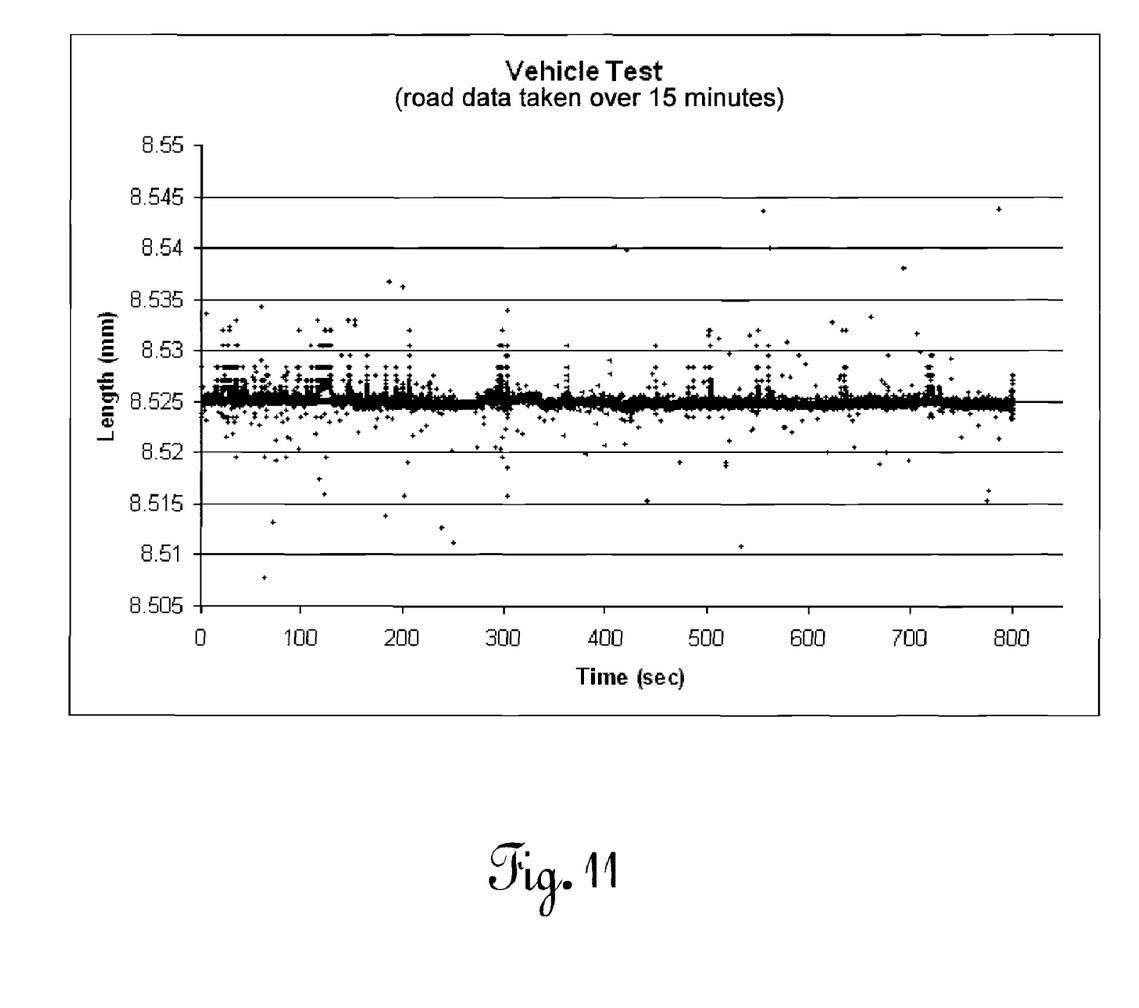

FIGS. 10 and FIG. 11 disclose test results from actual road tests using the alternative embodiment disclosed with reference to FIGS. 7A through 7C. FIG. 10 shows operation of the present invention with the vehicle at idle (no braking); no overall wear is evident. FIG. 11 shows system operation over a typical drive. Individual "braking events" appear as blips, but careful inspection shows an overall decrease in the brake pad (i.e., waveguide) length that is less than 0.0001 mm. Note that the plot shown in FIG. 11 should not show a linear function (unlike the graphs shown by FIG. 8 and FIG. 9) as it represents an actual drive, during which regression only occurs during breaking events and varies according to braking effort.

The present invention is described above in terms of a preferred illustrative embodiment of a specifically described regression measurement system, as well as alternative embodiments thereof. Those skilled in the art will recognize that alternative constructions of such a system and implementations of such a method can be used in carrying out the present invention. Other aspects, features, and advantages of the present invention may be obtained from a study of this disclosure and the drawings, along with the appended claims.

I claim:

1. A regression measurement system comprising:
   at least two optical waveguides having different attenuation coefficients matable to a regressable material;
   detector means for converting an optical electromagnetic signal from each of said at least two optical waveguides to an electrical signal representative of the intensity of said electromagnetic signals; and
   circuitry means electrically connected to said detector means, said circuitry means for converting said at least two electrical signals into at least one electrical signal representative of the length of said at least two optical waveguides.

2. The system of claim 1 further comprising a regressable material mated to said at least two optical waveguides.

3. The system of claim 1 wherein said optical waveguides are fiber optic cables.

4. The system of claim 1 wherein said detector means comprises a photodiode for each of said at least two optical waveguides.

5. The system of claim 1 further comprising a source of electromagnetic radiation for scattering electromagnetic radiation into said at least two waveguides.

6. The system of claim 1 wherein said at least two optical waveguides are embedded within said regressable material.

7. The system of claim 1 wherein said regressable material is a solid rocket fuel grain.

8. The system of claim 1 wherein said regressable material is a friction material of a braking system.

9. A system for measuring burn rate characteristics of a solid rocket motor comprising:
   a solid rocket fuel grain contained within a casing having an exterior surface;
   at least two optical waveguides having different attenuation coefficients embedded within said solid rocket fuel grain and extruded through said casing;
   detector means for converting an optical electromagnetic signal from each of said at least two optical waveguides to an electrical signal representative of the intensity of said electromagnetic signals;
   circuitry means electrically connected to said detector means, said circuitry means for converting said at least two electrical signals into at least one electrical signal representative of the length of said at least two optical waveguides; and
   an instrumentation housing containing said circuitry means and fastened to said exterior surface of said rocket casing.

10. The system of claim 9 wherein said optical waveguides are fiber optic cables.

11. The system of claim 9 further comprising a source of electromagnetic radiation for scattering electromagnetic radiation into said at least two waveguides.

12. A regression measurement system for determining brake wear in a vehicle, the system comprising:
   a brake pad having a friction material adapted to cause friction with a brake rotor;
   at least two optical waveguides having different attenuation coefficients mated to said friction material;
   detector means for converting an optical electromagnetic signal from each of said at least two optical waveguides to an electrical signal representative of the intensity of said electromagnetic signals; and circuitry means electrically connected to said detector means, said circuitry means for converting said at least two electrical signals into at least one electrical signal representative of the length of said at least two optical waveguides.

13. The regression measurement system of claim 12 further comprising an instrumentation housing containing said circuitry means fastened to said vehicle.

14. A method for measuring the regression rate of a regressable material comprising:
 coupling electromagnetic radiation into at least two optical waveguides;
 converting the intensity of an optical electromagnetic signal from said at least two optical waveguides into one electrical signal for each of said optical waveguides;
 calculating the natural log of the ratio of the electrical signals divided by the difference of the attenuation coefficients into a result; and
 providing an electrical signal representative of said result.

15. The method of claim 14 further comprising mating at least two optical waveguides having different attenuation coefficients to said regressable material.

16. The method of claim 14 further comprising causing said material to regress.

17. The method of claim 16 wherein said causing step further comprises igniting said material.

* * * * *